United States Patent
Chang et al.

(10) Patent No.: US 9,858,182 B2
(45) Date of Patent: Jan. 2, 2018

(54) STORAGE DEVICE AND GARBAGE COLLECTION METHOD OF DATA STORAGE SYSTEM HAVING THE STORAGE DEVICE

(71) Applicant: SAMSUNG ELECTRONICS CO., LTD., Suwon-si, Gyeonggi-do (KR)

(72) Inventors: Wooseok Chang, Seoul (KR); Kangho Roh, Seoul (KR); Jongwon Lee, Seoul (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 169 days.

(21) Appl. No.: 14/735,834

(22) Filed: Jun. 10, 2015

(65) Prior Publication Data
US 2016/0077964 A1   Mar. 17, 2016

(30) Foreign Application Priority Data
Sep. 11, 2014   (KR) .................. 10-2014-0120149

(51) Int. Cl.
*G06F 12/02* (2006.01)
*G06F 13/42* (2006.01)

(52) U.S. Cl.
CPC ...... *G06F 12/0253* (2013.01); *G06F 12/0246* (2013.01); *G06F 13/4282* (2013.01); *G06F 2212/7201* (2013.01); *G06F 2212/7205* (2013.01); *Y02B 60/1228* (2013.01); *Y02B 60/1235* (2013.01)

(58) Field of Classification Search
CPC ............ G06F 12/0253; G06F 12/0246; G06F 13/4282; G06F 2212/7201; G06F 2212/7205; Y02B 60/1228; Y02B 60/1235
See application file for complete search history.

(56) References Cited

U.S. PATENT DOCUMENTS

| | | | |
|---|---|---|---|
| 6,151,685 A | 11/2000 | Li et al. | |
| 6,889,254 B1* | 5/2005 | Chandra | G06F 17/30545 707/E17.032 |
| 7,657,584 B2 | 2/2010 | Kawamura et al. | |
| 7,679,133 B2 | 3/2010 | Son et al. | |
| 8,032,724 B1* | 10/2011 | Smith | G06F 12/0269 711/159 |
| 8,166,269 B2 | 4/2012 | Vengerov | |
| 8,281,050 B2 | 10/2012 | Otani et al. | |
| 8,312,464 B2 | 11/2012 | Arimilli et al. | |
| 8,341,342 B1 | 12/2012 | Bonwick et al. | |
| 8,352,690 B2 | 1/2013 | Forhan et al. | |
| 8,402,217 B2 | 3/2013 | Burd | |

(Continued)

FOREIGN PATENT DOCUMENTS

WO   WO 2013048451   4/2013

*Primary Examiner* — Reginald Bragdon
*Assistant Examiner* — Mehdi Namazi
(74) *Attorney, Agent, or Firm* — F. Chau & Associates, LLC

(57) ABSTRACT

A garbage collection method of a data storage system having storage devices is provided. The method includes determining whether a garbage collection is needed in one of the storage devices, transferring a multicast garbage collection command from one of the storage devices to at least one other storage device in a write group through a multicast operation, and performing the garbage collection in one of the storage devices.

16 Claims, 12 Drawing Sheets

(56) References Cited

U.S. PATENT DOCUMENTS

| | | |
|---|---|---|
| 8,452,911 B2 | 5/2013 | Gorobets et al. |
| 8,533,372 B2 | 9/2013 | Inagaki |
| 8,553,466 B2 | 10/2013 | Han et al. |
| 8,559,235 B2 | 10/2013 | Yoon et al. |
| 8,566,549 B1 | 10/2013 | Burke et al. |
| 8,601,036 B2 | 12/2013 | Nalla et al. |
| 8,601,211 B2 | 12/2013 | Flynn et al. |
| 8,654,587 B2 | 2/2014 | Yoon et al. |
| 8,688,899 B2 | 4/2014 | Nellans et al. |
| 8,713,268 B2 | 4/2014 | Dillow et al. |
| 8,886,691 B2 | 11/2014 | Colgrove et al. |
| 2005/0027881 A1* | 2/2005 | Figueira ............ H04L 61/2015 709/238 |
| 2010/0269015 A1* | 10/2010 | Borchers ............ G06F 12/0246 714/758 |
| 2011/0233648 A1 | 9/2011 | Seol et al. |
| 2012/0068242 A1* | 3/2012 | Shin ................ H01L 27/11582 257/315 |
| 2013/0067294 A1* | 3/2013 | Flynn .................... G06F 1/183 714/773 |
| 2013/0191609 A1* | 7/2013 | Kunimatsu ............ G06F 12/10 711/203 |
| 2014/0013048 A1 | 1/2014 | Biederman et al. |
| 2014/0189212 A1 | 7/2014 | Slaight et al. |
| 2014/0372698 A1 | 12/2014 | Lee et al. |

* cited by examiner

| Priority | Time |
|---|---|
| Low | GCT1 |
| Middle | GCT2 |
| High | GCT3 |
| Urgent | GCT4 |

STORAGE DEVICE AND GARBAGE COLLECTION METHOD OF DATA STORAGE SYSTEM HAVING THE STORAGE DEVICE

CROSS-REFERENCE TO RELATED APPLICATION

The present U.S. non-provisional patent application claims under 35 U.S.C. §119 priority to and the benefit of Korean Patent Application No. 10-2014-0120149, filed on Sep. 11, 2014, the entire contents of which are incorporated by reference herein.

BACKGROUND

The present disclosure relates to a storage device, and a garbage collection method of a data storage system having the storage device.

A semiconductor memory device may be classified into a volatile memory device such as a dynamic random access memory (DRAM), a static random access memory (SRAM), and the like, and a nonvolatile memory device such as an electrically erasable programmable read only memory (EEPROM), a ferroelectric random access memory (FRAM), a phase-change random access memory (PRAM), a magnetoresistive random access memory (MRAM), a flash memory, and the like. The volatile memory device loses stored data when power is interrupted while the nonvolatile memory device can retain stored data even when power is interrupted. A flash memory has the advantages of high programming speed, low power consumption, high storage capacity. Thus, a data storage device based upon the flash memory is widely used. Examples of the data storage device based upon the flash memory include a solid state drive (SSD) replacing a conventional hard disk and a memory card such as a Secure Digital (SD) card, a MultiMediaCard (MMC), and the like.

SUMMARY

Exemplary embodiments of the inventive concepts of the present disclosure provide a garbage collection method of a data storage system having storage devices. The garbage collection method may include determining whether a garbage collection is needed in one of the storage devices, transferring a multicast garbage collection command from one of the storage devices to at least one other storage device in a write group through a multicast operation, and performing the garbage collection in one of the storage devices.

Exemplary embodiments of the inventive concepts of the present disclosure also provide storage devices. A storage device may include a plurality of nonvolatile memory devices, and a memory controller issuing a first multicast garbage collection command when a garbage collection is needed, transferring the first multicast garbage collection command to other storage devices in a write group through a multicast operation or receiving a second multicast garbage collection command from at least one of the other storage devices through a multicast operation, and performing a garbage collection in response to the first multicast garbage collection command or the second multicast garbage collection command.

Exemplary embodiments of the inventive concepts of the present disclosure also provide data storage systems. A data storage system may include a central processing unit (CPU), a root complex which is connected to the central processing unit and replaces a transaction of the central processing unit, a system memory storing data occurring during an operation of the central processing unit or the root complex, endpoint devices transmitting/receiving data through a peripheral component interconnect express (PCIe) interface, and an interface switch having an upstream port connected to the root complex, downstream ports connected to each of the endpoint devices and a virtual channel supporting a multicast operation. Each of the endpoint devices performs a global garbage collection through the multicast operation.

DETAILED DESCRIPTION

Figure 1:
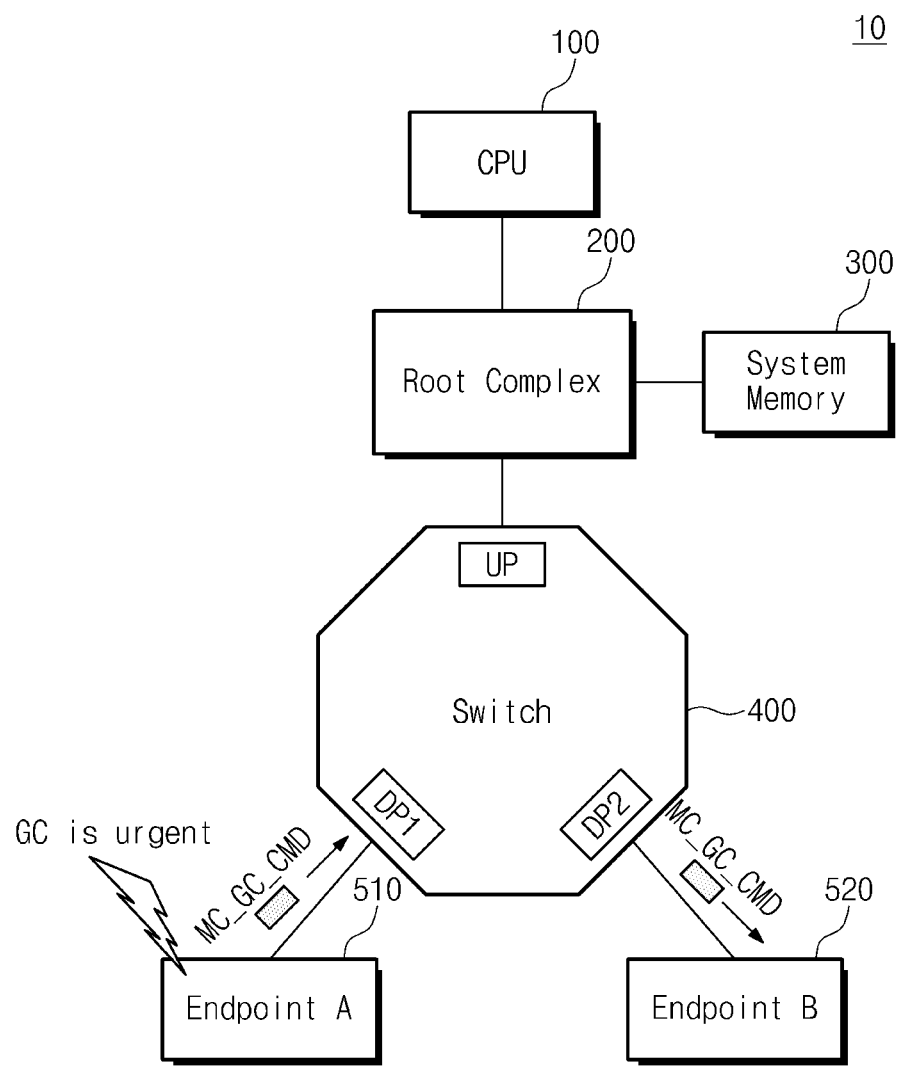
FIG. 1 is a drawing depicting inventive concepts of the present disclosure.

Exemplary embodiments of the inventive concepts of the present disclosure will be described more fully hereinafter based upon the accompanying drawings, in which the exemplary embodiments of the inventive concepts of the present disclosure are shown. The inventive concepts of the present disclosure may, however, be configured in many different forms and should not be construed as limited to the embodiments set forth herein. Rather, these embodiments are provided so that the present disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and the like, may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element's or feature's relationship to another element(s) or feature(s) as illustrated in the drawings. It will be understood that the spatially relative terms are intended to encompass different orientations of the device in use or operation in addition to the orientation depicted in the figures. For example, if the device in the drawings is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concepts of the present disclosure. As used herein, the singular forms "a," "an" and "the" are intended to include the plural forms as well, unless the context clearly indicates otherwise. It will be further understood that the terms "comprises" and/or "comprising," if used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When an exemplary embodiment can be implemented differently, functions or operations described in a particular block may occur in a different way from the flow described in a flowchart. For example, two consecutive blocks may be performed simultaneously, or the blocks may be performed in reverse according to related functions or operations.

FIG. 1 is a drawing depicting inventive concepts of the present disclosure. Referring to FIG. 1, a data storage system 10 may include at least one central processing unit 100, a root complex 200, a system memory 300, an interface switch 400 and a plurality of endpoint devices 510, 520.

The central processing unit 100 may control the overall operation of the data storage system 10.

The root complex 200 may be connected to the central processing unit 100 through an internal bus. The root complex 200 can manage a transaction between the central processing unit 100 and the end point devices 510, 520. For example, the root complex 200 can rout messages related to the transaction. The root complex 200 may be directly connected to the end point devices 510, 520 or may be connected to the end point devices 510, 520 through at least one interface switch 400.

The root complex 200 may be configured as a device separated from the central processing unit 100 or may be configured to be integrated in the central processing unit 100.

The system memory 300 can store data needed to drive the central processing unit 100 and the root complex 200. The system memory 300 may be connected to the root complex 200 or the central processing unit 100. The system memory 300 may be a DRAM or a PRAM.

The interface switch 400 may connect the root complex 200 to the end point devices 510, 520. The interface switch 400 may be configured to support a multicast operation of the root complex 200 or a multicast operation between the end point devices 510, 520, the multicast operation meaning the transmission of one transmission packet to several places.

The interface switch 400 may include an upstream port UP and downstream ports DP1, DP2 that are connected to the end point devices 510, 520, respectively.

Each of the end point devices 510, 520 may store data. Each of the end point devices 510, 520 may be configured to support the multicast operation. Each of the end point devices 510, 520 may be a storage device configured as a nonvolatile memory device. For example, each of the end point devices 510, 520 may be an SSD, a universal flash storage (UFS), and the like.

The end point devices 510, 520 can share a message related to a garbage collection, that is, a multicast garbage collection command MC_GC_CMD by the multicast operation.

For example, when the garbage collection is urgently needed in the first end point device 510, the first end point device 510 may issue the multicast garbage collection command MC_GC_CMD including garbage collection information, and may transmit the issued multicast garbage collection command MC_GC_CMD to the interface switch 400. Whether the garbage collection is urgent or not may be determined depending upon the number of free blocks. For example, if the number of free blocks is smaller than a predetermined value, the garbage collection may be considered to be urgent. The interface switch 400 may transmit the transmitted multicast garbage collection command MC_GC_ CMD to the second end point device 520 in the same group, for example, a redundant array of independent disks (RAID) as the first end point device 510.

After transmitting the multicast garbage collection command MC_GC_CMD to the interface switch 400, the first end point device 510 can perform the garbage collection. The second end point device 520 may receive the multicast garbage collection command MC_GC_CMD from the interface switch 400 and can perform a garbage collection needed in the second end point device 520. However, the garbage collection performed on the second end point device 520 may not be urgent. Consequently, the first and second end point devices 510, 520 can perform the garbage collection at the same time. This is called a global garbage collection.

The data storage system 10 can synchronize the global garbage collection on the basis of the multicast garbage collection command MC_GC_CMD transmitted by the multicast operation. The data storage system 10 can more effectively manage the garbage collection as compared with a conventional methodology by having the end point devices 510, 520 that input and output the multicast garbage collection command MC_GC_CMD.

In exemplary embodiments of the inventive concepts the interface switch 400 and the end point devices 510, 520 can have a peripheral component interconnect express (PCIe) and the end point devices 510, 520 are SSDs.

Figure 2:
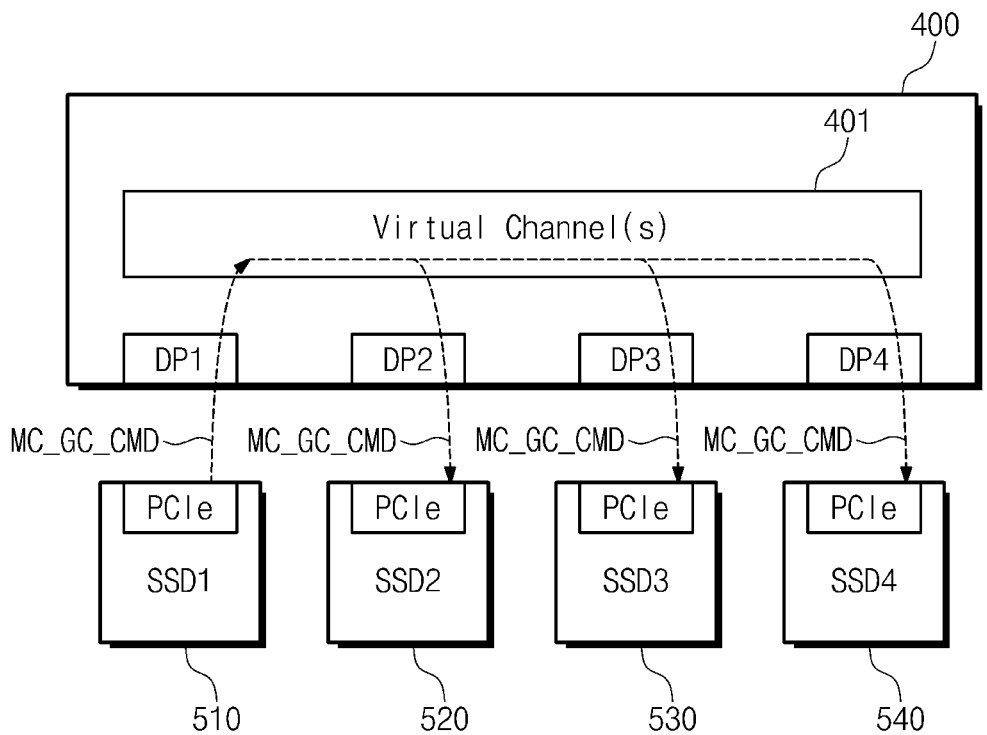
FIG. 2 is a block diagram illustrating an interface switch shown in FIG. 1.

FIG. 2 is a block diagram illustrating the interface switch shown in FIG. 1. Referring to FIG. 2, the interface switch 400 may include at least one virtual channel 401 and downstream ports DP1, DP2, . . . DP4. The interface switch 400 may be configured according to a PCIe interface regulation.

The interface switch 400 may operate according to a traffic class (TC) and a virtual channel (VC) 401 by the PCIe interface regulation. The TC may include a tag according to importance of traffic. The virtual channel 401 may set virtual routing information and may transmit the traffic to a target channel. The virtual channel 401 may be divided into a plurality of queues according to the TC or may bypass the queue.

Each of storage devices 510, 520, 530, 540 may be connected to the virtual channel 401 through the downstream ports DP1, DP2, . . . DP4. Each of the storage devices 510, 520, 530, 540 may be configured to communicate according to the PCIe interface regulation.

As illustrated in FIG. 2, a multicast garbage collection command MC_GC_CMD generated in the first storage device 510 may be transmitted to the second through fourth SSDs 520, 530, 540 via the virtual channel 401.

Figure 3:
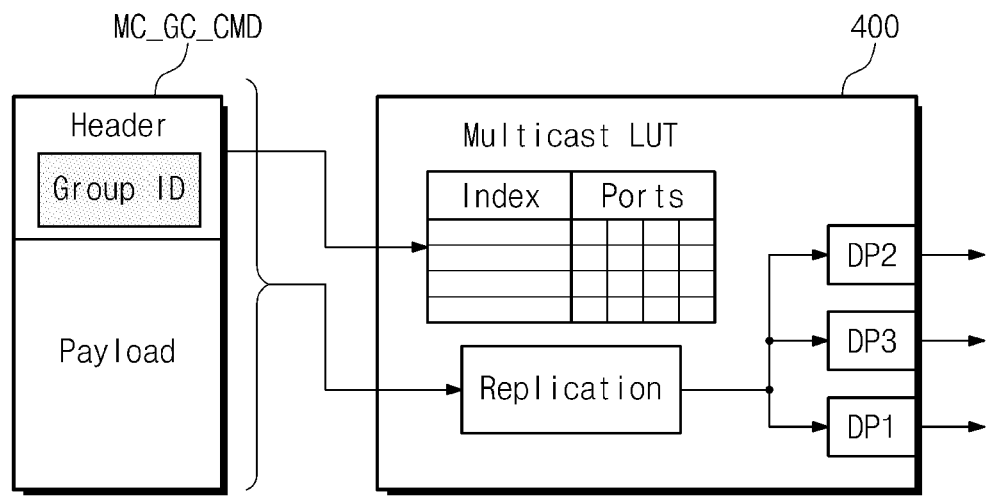
FIG. 3 is a drawing depicting a multicast operation of the virtual channel illustrated in FIG. 2.

FIG. 3 is a drawing depicting a multicast operation of a virtual channel illustrated in FIG. 2. Referring to FIGS. 2 and 3, the multicast operation of the virtual channel 401 is performed as follows. In an initial operation of the virtual channel 401, a multicast lookup table (LUT) according to a group ID may be set in advance. If a multicast garbage collection command MC_GC_CMD is input from any one storage device, the virtual channel 401 may search corresponding ports DP2, DP3 based upon the multicast lookup table LUT, copy the multicast garbage collection command MC_GC_CMD, and transmit the copied multicast garbage collection command MC_GC_CMD to the corresponding ports DP2, DP3.

The multicast garbage collection command MC_GC_CMD, as illustrated in FIG. 3, may include a header and a payload. The header may include a group ID, and the payload may include garbage collection time information.

Figure 4:
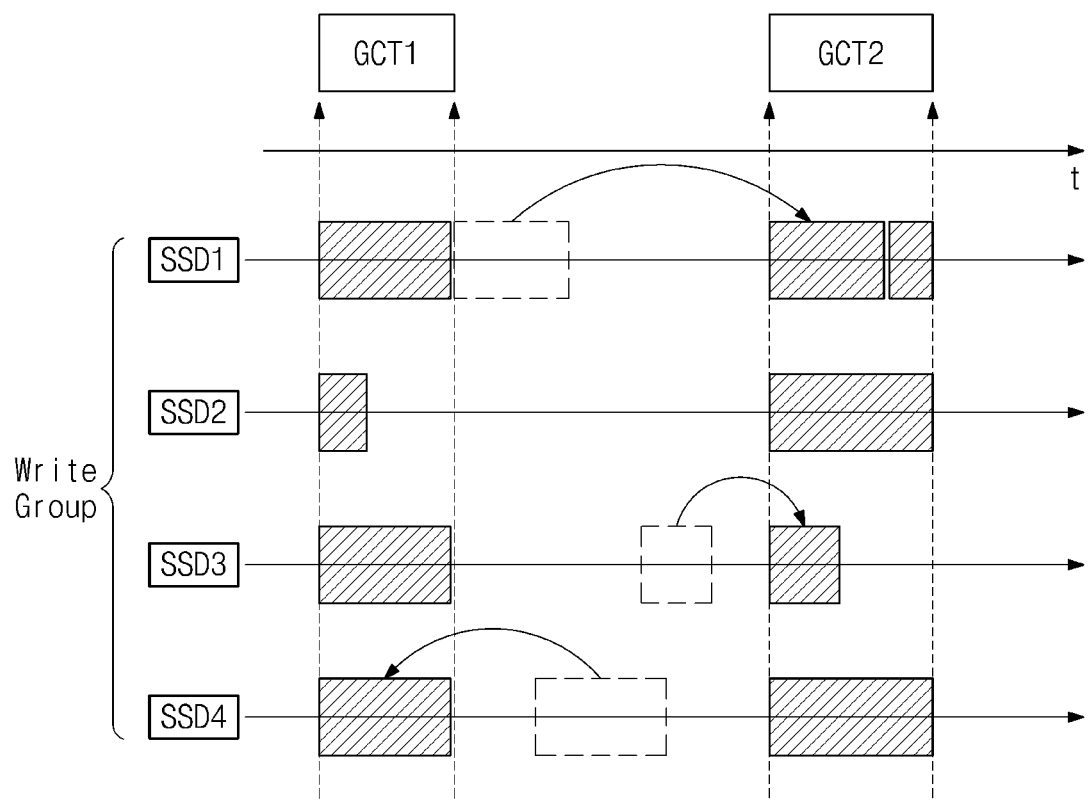
FIG. 4 is a drawing depicting a global garbage collection of a data storage system according to an exemplary embodiment of the inventive concepts of the present disclosure.

FIG. 4 is a drawing depicting a global garbage collection of a data storage system according to an exemplary embodiment of the inventive concepts of the present disclosure. In FIG. 4, for convenience of description, in an exemplary embodiment one RAID has four storage devices SSD1, SSD2, SSD3, SSD4, the RAID being considered a virtual disk having a function.

A global garbage collection may be performed in garbage collection periods GCT1, GCT2 according to a multicast garbage collection command MC_GC_CMD. A length (i.e., time) of the garbage collection periods GCT1, GCT2 may be changed depending on garbage collection time information included in the multicast garbage collection command MC_GC_CMD.

As illustrated in FIG. 4, regarding first storage device SSD1, a garbage collection that is not completed in the first garbage collection period GCT1 may be performed in the second garbage collection period GCT2. Regarding third storage device SSD3, although the garbage collection is needed, if it is not urgent, the garbage collection may be performed in the second garbage collection period GCT2 after the multicast garbage collection command MC_GC_CMD is input. Regarding the fourth storage device SSD4, a part of the garbage collection may be performed in the first garbage collection period GCT1 after the multicast garbage collection command MC_GC_CMD is input.

A general data storage system is aligned at a storage device having the lowest performance. That is, performance of any one storage device having slow response time determines performance of a whole virtual driver. However, in the data storage device 10 of the present disclosure, the performance of the virtual driver may not be aligned at the performance of any one storage device by performing the garbage collection on the storage devices SSD1, SSD2, SSD3, SSD4 at the same time according to the multicast garbage collection command MC_GC_CMD.

The data storage system 10, as illustrated in FIG. 4, can prevent the performance of the virtual driver constituted by RAID from being degraded by managing the storage devices SSD1, SSD2, SSD3, SSD4 so that the garbage collection can be performed in the global garbage collection period in response to the multicast garbage collection command MC_GC_CMD.

Figure 5:
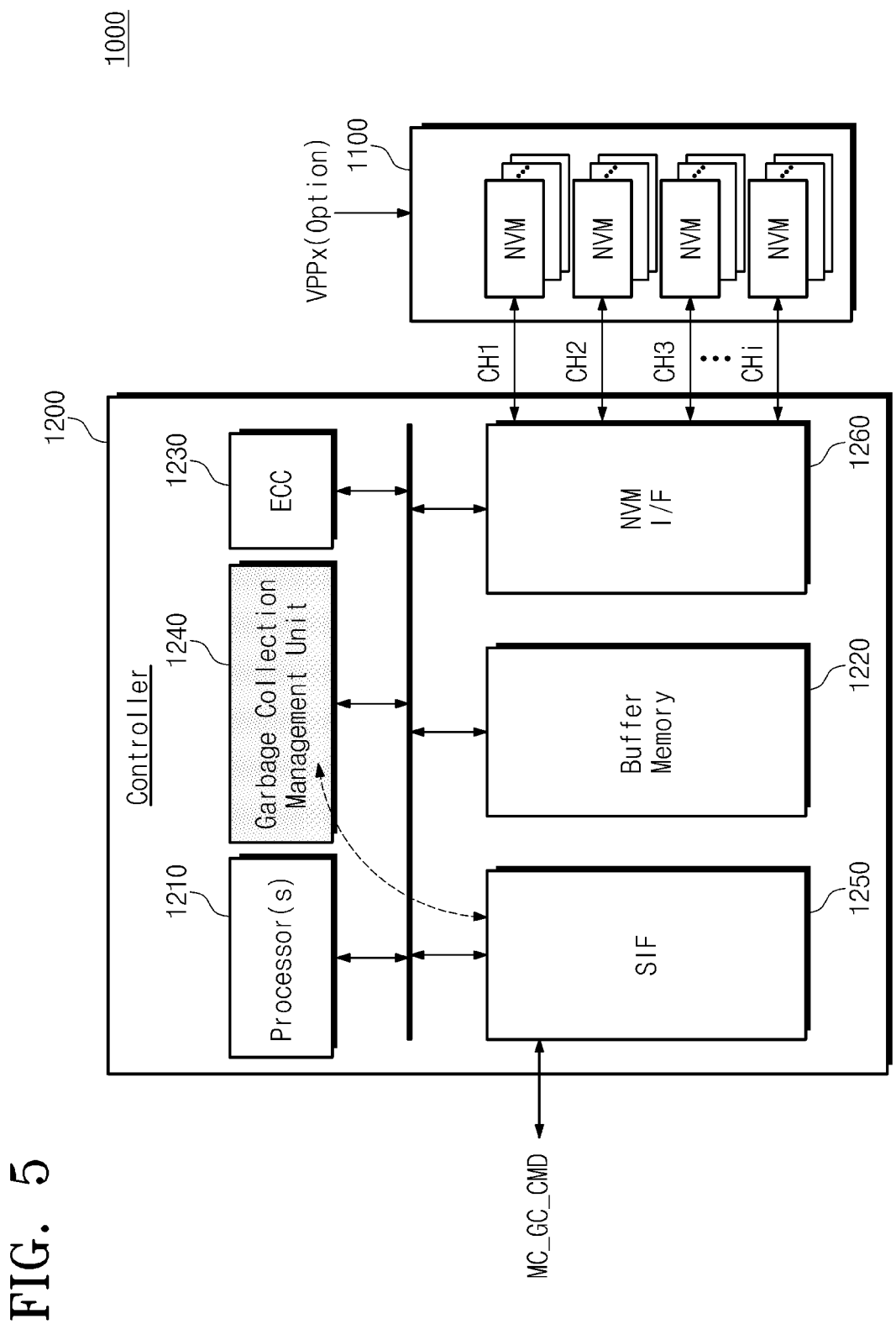
FIG. 5 is a block diagram illustrating a storage device according to an exemplary embodiment of the inventive concepts of the present disclosure.

FIG. 5 is a block diagram illustrating a storage device according to an exemplary embodiment of the inventive concepts of the present disclosure. Referring to FIG. 5, a storage device 1000 may include a plurality of nonvolatile memory devices 1100 and a memory controller 1200 controlling the nonvolatile memory devices. The storage device 1000 may be various types of storage devices such as an SSD, an embedded multimedia card (eMMC), an SD card, a universal serial bus (USB) device, and the like. The storage device 1000 can support a multicast operation.

Each nonvolatile memory device 1100 may include a plurality of memory blocks having memory cells storing at least one bit. Each nonvolatile memory device 1100 may be a NAND flash memory, a vertical NAND flash memory (VNAND), a NOR flash memory, a resistive random access memory (RRAM), a PRAM, an MRAM, an FRAM, a spin transfer torque random access memory (STT-RAM), and the like.

Each nonvolatile memory device 1100 may be configured as a three-dimensional array structure. In an exemplary embodiment of the present inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate, term "monolithic" meaning that layers of each level of the array are directly deposited on the layers of each underlying level of the array.

In an exemplary embodiment of the present inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having a similar structure as the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The inventive concepts of the present disclosure can be applied to not only a flash memory device of which a charge storage layer has a conductive floating gate but also a charge trap flash (CTF) of which a charge storage layer can be an insulating layer. The nonvolatile memory devices 1100 may be configured to optionally receive an external high voltage Vpp.

The memory controller 1200 may be connected to the nonvolatile memory devices 1100 through a plurality of channels CH1, CH2, . . . CHi (i being an integer of 2 or more). The memory controller 1200 may include at least processor 1210, a buffer memory 1220, an error correction circuit (ECC) 1230, a garbage collection management unit 1240, a storage interface (SIF) 1250, and a nonvolatile memory interface (NVM IF) 1260.

The processor 1210 can control the overall operation of the storage device 1000. The buffer memory 1220 may temporarily store data needed to drive the memory controller 1200. For example, the buffer memory 1220 can temporarily store input/output data when an input/output request of a host occurs. The buffer memory 1220, in a write operation, may temporarily store data input from external devices in order to program the data in the nonvolatile memory devices 1100. The buffer memory 1220, in a read operation, may temporarily store data read from the nonvolatile memory devices 1100 to output the data to the external devices. The buffer memory 1220 may include a plurality of memory lines storing data or a command. The memory lines may be mapped into cache lines that are directly accessed from the processor 1210 in a variety of ways. The cache lines may exist inside the processor 1210 or may separately exist outside the processor 1210.

The error correction circuit 1230 may be configured to detect and correct an error of input/output data. For example, the error correction circuit 1230 can calculate an error correction code value of data that is to be programmed in a write operation, correct an error of data read in a read operation on the basis of the error correction code value, and correct an error of data read from the nonvolatile memory device 1100 in a data restoration operation.

Although not illustrated, the storage device 1000 may further include a code memory storing code data needed to drive the memory controller 1200. The code memory may be configured as a nonvolatile memory device (for example, PRAM, MRAM, and the like).

The garbage collection management unit 1240 can internally perform a garbage collection, issue a multicast garbage collection command MC_GC_CMD for performing a global garbage collection if necessary, or perform a global garbage collection in response to the multicast garbage collection command MC_GC_CMD input from the external devices through the storage interface 1250. The multicast garbage collection command MC_GC_CMD may include garbage collection time information relevant to garbage collection performance time.

The garbage collection management unit 1240 may be configured in hardware, software and firmware.

The storage interface 1250 can provide an interface function with external devices. The storage interface 1250 may be changed to a data structure that can receive a global garbage collection command generated in the garbage collection management unit 1240 from another storage device, or may be configured to receive the multicast garbage collection command MC_GC_CMD issued from an external storage device. That is, the multicast garbage collection command MC_GC_CMD that is input/output in the storage interface 1250 may follow an interface rule supporting the multicast operation. For example, the storage interface 1250 may be a PCIe interface, or a thundervolt interface.

The nonvolatile memory interface 1260 can provide an interface function with the nonvolatile memory device 1100.

The storage device 1000 can issue and receive the multicast garbage collection command MC_GC_CMD relevant to the global garbage collection and, can perform the global garbage collection in response to the issued/received multicast garbage collection command MC_GC_CMD.

A priority with respect to the global garbage collection may be given according to the garbage collection time information included in the multicast garbage collection command MC_GC_CMD. The garbage collection time may be determined by the number (or the number of blocks) of merge operations and/or program operations needed in the garbage collection.

Figures 6, 7:
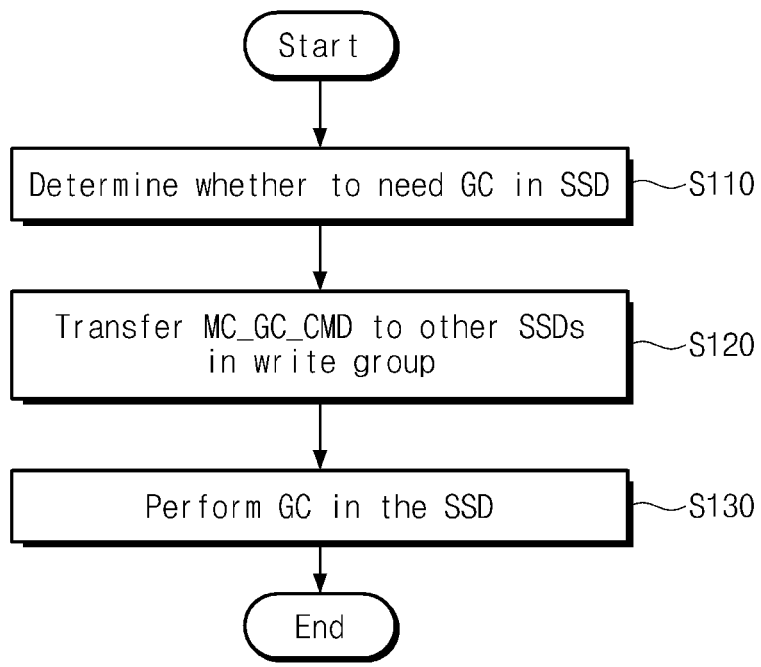
FIG. 6 is a table illustrating a priority of a global garbage collection according to an exemplary embodiment of the inventive concepts of the present disclosure.
FIG. 7 is a flowchart illustrating a garbage collection method of a storage device according to an exemplary embodiment of the inventive concepts of the present disclosure.

FIG. 6 is a table illustrating a priority of a global garbage collection according to an exemplary embodiment of the inventive concepts of the present disclosure. Referring to FIG. 6, the priority is given according to garbage collection time included in a multicast garbage collection command MC_GC_CMD. For example, when the garbage collection time needed in a garbage collection is greater than first time GCT1, the priority is low. When the garbage collection time is greater than second time GCT2, the priority is in the middle. When the garbage collection time is greater than third time GCT3, the priority is high. When the garbage collection time is greater than fourth time GCT4, the priority is urgent.

The priority of the global garbage collection illustrated in FIG. 6 is only illustrative. The global garbage collection of the present disclosure may be set by diversely subdividing the priority on the basis of at least one parameter relevant to time information needed in the garbage collection.

FIG. 7 is a flowchart illustrating an exemplary embodiment of a garbage collection method of a storage device according to an exemplary embodiment of the inventive concepts of the present disclosure. Referring to FIGS. 1 through 7, a garbage collection of the storage device 1000 is performed as follows. The garbage collection management unit 1240 of the storage device 1000 may determine whether the garbage collection is needed in the storage device 1000 (S110). If the garbage collection is needed, garbage collection time GCT needed in the garbage collection can be calculated. If the garbage collection is needed, a multicast garbage collection command MC_GC_CMD relevant to the garbage collection may be issued and transferred to other storage devices existing in the same group (S120). The multicast garbage collection command MC_GC_CMD may include garbage collection time information. After that, the garbage collection management unit 1240 may perform the garbage collection with respect to the storage device 1000.

The garbage collection method of the storage device 1000 may perform the garbage collection after transferring the multicast garbage collection command MC_GC_CMD.

Figure 8:
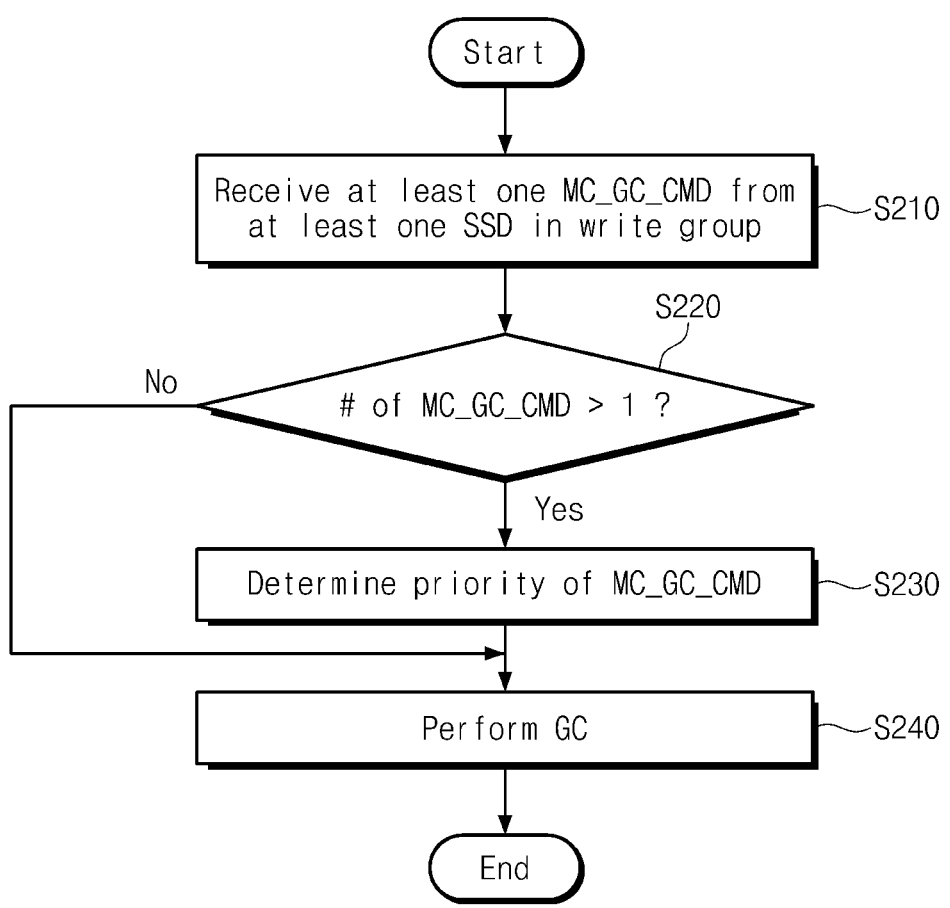
FIG. 8 is a flowchart illustrating a garbage collection method of a storage device according to an exemplary embodiment of the inventive concepts of the present disclosure.

FIG. 8 is a flowchart illustrating a garbage collection method of a storage device according to an exemplary embodiment of the inventive concepts of the present disclosure. Referring to FIGS. 1 through 6 and 8, a garbage collection of the storage device 1000 is performed as follows. At least one multicast garbage collection command MC_GC_CMD relevant to the garbage collection from at least one storage device in a write group may be input in the storage device 1000 (S210). The garbage collection management unit 1240 may determine whether the number of the multicast garbage collection commands MC_GC_CMD is greater than 1 (S220). If two or more multicast garbage collection commands MC_GC_CMD are input, a priority of the multicast garbage collection commands MC_GC_CMD may be determined. For example, a relatively high priority may be given to the multicast garbage collection commands MC_GC_CMD having long garbage collection time. The multicast garbage collection commands MC_GC_CMD may include garbage collection time information.

After that, the garbage collection may be performed during the garbage collection time included in the priority multicast garbage collection command. If only one multicast garbage collection command is input, the garbage collection may be performed during the garbage collection time included in the inputted multicast garbage collection command (S240).

The garbage collection method of the storage device 1000 can perform the garbage collection during the garbage collection time included in the inputted multicast garbage collection command MC_GC_CMD.

Figure 9:
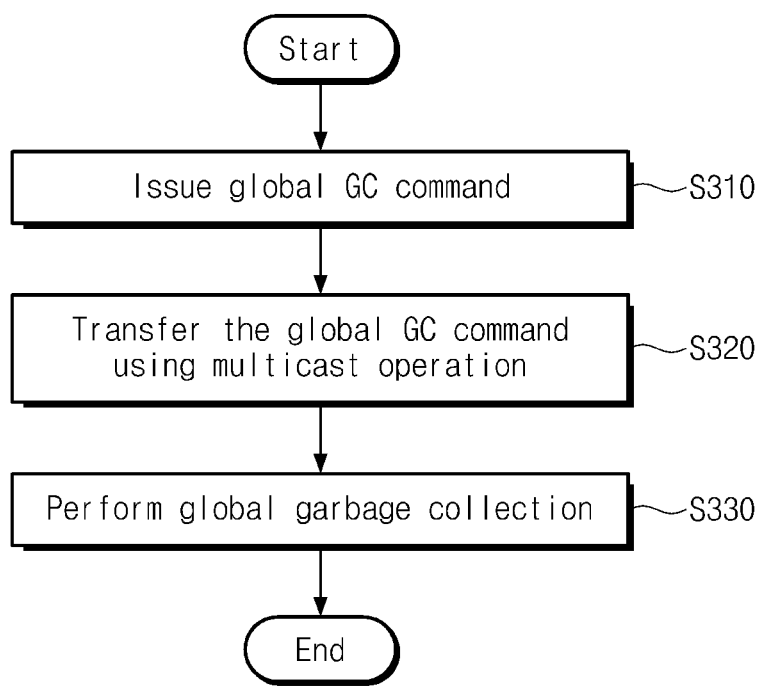
FIG. 9 is a flowchart illustrating a global garbage collection method of a data storage system according to an exemplary embodiment of the inventive concepts of the present disclosure.

FIG. 9 is a flowchart illustrating a global garbage collection method of a data storage system according to an exemplary embodiment of the inventive concepts of the present disclosure. Referring to FIGS. 1 through 9, in the global garbage collection method, a multicast global garbage collection command MC_GC_CMD may be issued in any one storage device (S310). The issued multicast global garbage collection command MC_GC_CMD may be transferred to other storage devices using a multicast operation (S320). After that, the global garbage collection may be performed (S330).

The global garbage collection method of the present disclosure can perform the global garbage collection during a predetermined time in response to the multicast global garbage collection command MC_GC_CMD.

In the data storage system of the present disclosure, each storage device constituting RAID may share its garbage collection time and its needed information through the multicast operation, and thereby overall response time and an overall output can be increased.

A message can be diversely processed in a variety of ways. The data storage system of the present disclosure can perform a fast global collection synchronization by processing a message in a vendor specific interrupt service routine form. A PCI multicast group may be performed after registering a multicast group that fits PCI switch capability on the basis of a predetermined write group.

Figure 10:
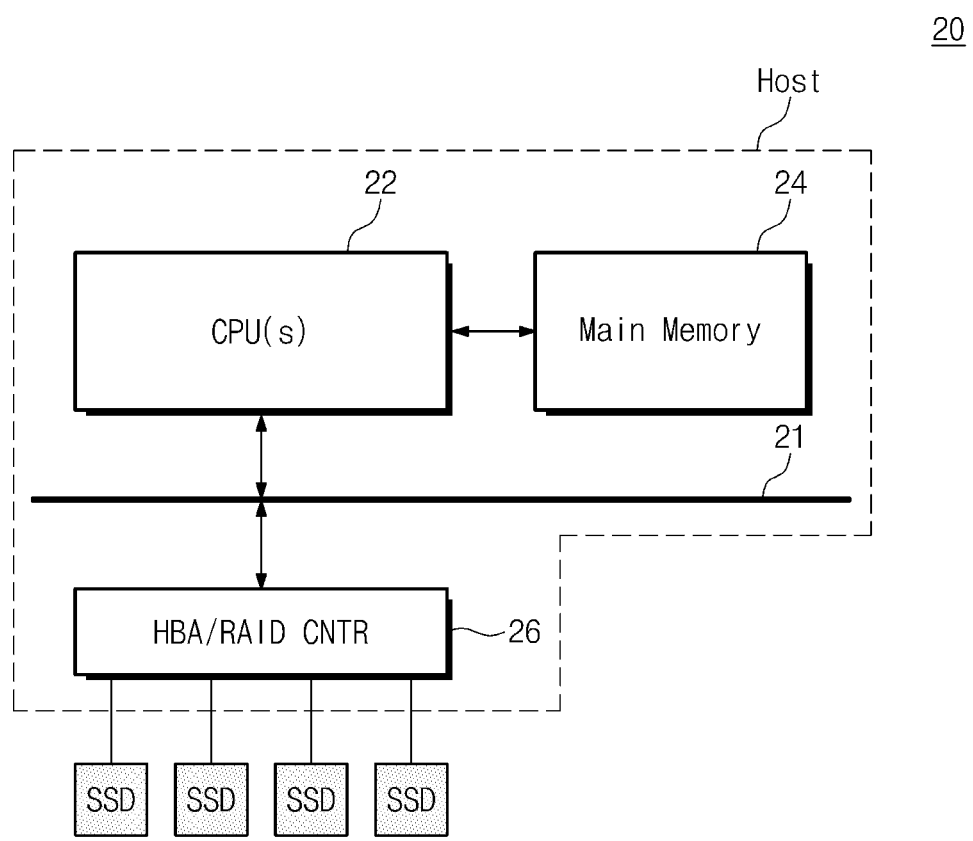
FIG. 10 is a drawing illustrating a host system according to an exemplary embodiment of the inventive concepts of the present disclosure.

FIG. 10 is a drawing illustrating a host system according to an exemplary embodiment of the inventive concepts of the present disclosure. Referring to FIG. 10, a host system 20 may include a host having at least one central processing unit 22 and a main memory 24, and a data storage system having a plurality of storage devices SSDs and a storage controller 26.

The central processing unit 22 and the storage controller 26 may be connected to each other through a host bus 21. The storage device SSD of FIG. 10 may be configured as the storage device 1000 illustrated in FIG. 5.

Since the host system 20 autonomously performs a global garbage collection in the data storage system, the global garbage collection does not need to be considered in the host. Thus, the host system 20 can lighten the burden due to the global garbage collection in the host as compared with a conventional host system. A use rate and power consumption of the central processing unit by the global garbage collection can be greatly reduced.

A limited number of storage devices can be connected to the storage controller 26 illustrated in FIG. 10. Generally, to increase the number of storage devices connected to the storage controller 26, an expander may be added. The inventive concepts of the present disclosure can be applied to the expanding controller.

Figure 11:
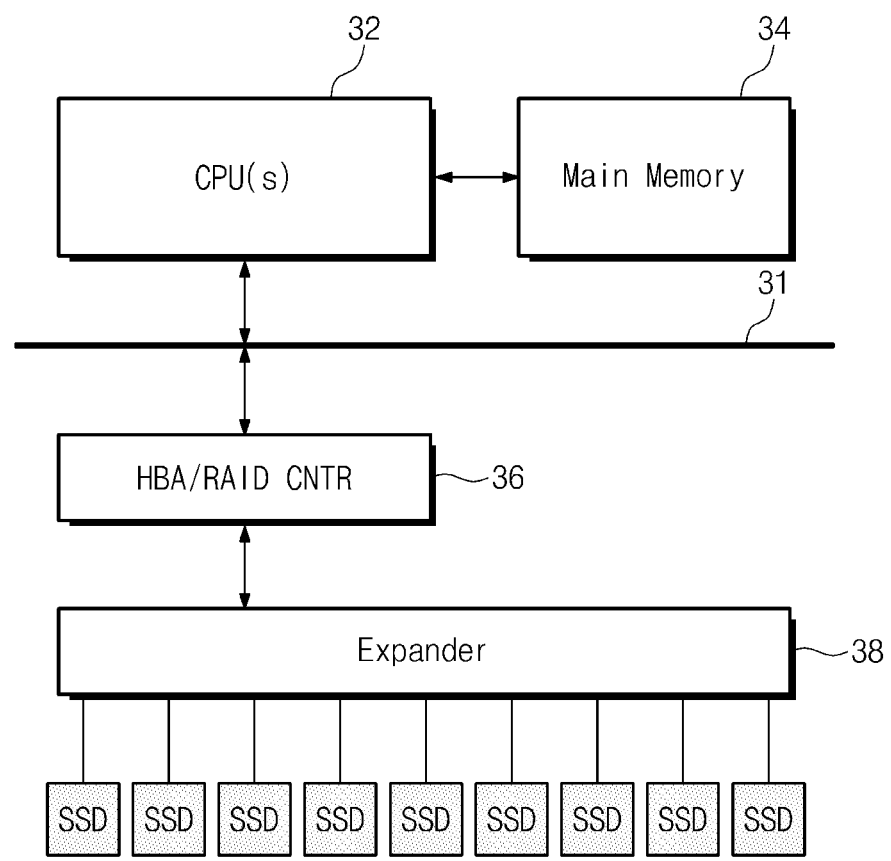
FIG. 11 is a drawing illustrating a host system according to an exemplary embodiment of the inventive concepts of the present disclosure.

FIG. 11 is a drawing illustrating a host system according to an exemplary embodiment of the inventive concepts of the present disclosure. Referring to FIG. 11, a host system 30 may include a host constituted by at least one central processing unit 32 and a main memory 34, and a data storage system having a plurality of storage devices SSDs, a storage controller 36 and an expander 38. The storage device SSD of FIG. 11 may be configured as the storage device 1000 illustrated in FIG. 5.

In FIGS. 1 through 11, a middle medium (for example, a storage controller, an expander) may exist between the host and the storage device. However, the global garbage collection of the present disclosure is not limited to the structure described above. The inventive concepts of the present disclosure can be applied to a host system in which a host and a storage device are directly connected to each other.

Figure 12:
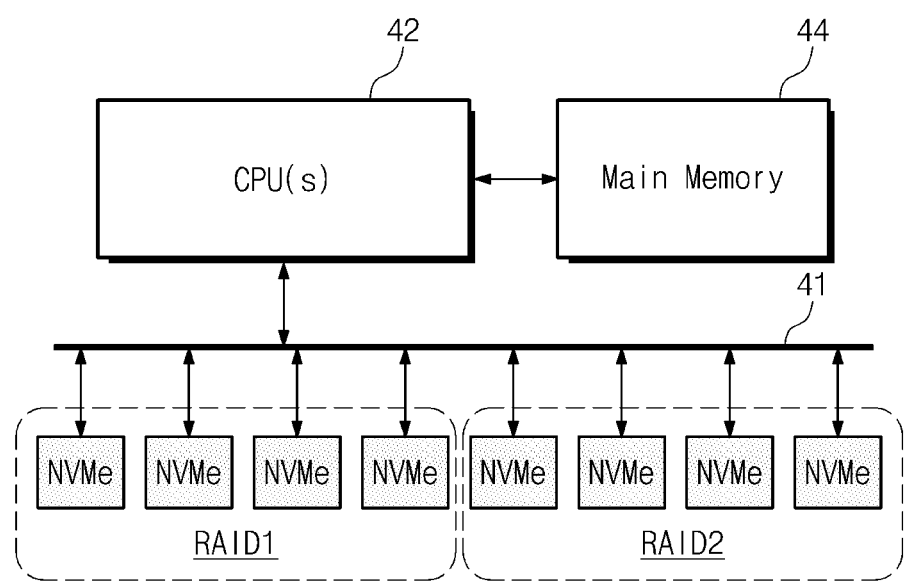
FIG. 12 is a drawing illustrating a host system according to an exemplary embodiment of the inventive concepts of the present disclosure.

FIG. 12 is a drawing illustrating a host system according to an exemplary embodiment of the inventive concepts of the present disclosure. Referring to FIG. 12, a host system 40 may include a host having at least one central processing unit 42 and a main memory 44, and a plurality of storage devices NVMe. The storage device NVMe of the present disclosure may be configured to issue or receive a multicast garbage collection command relevant to a global garbage collection using a point-to-point interface.

Referring to FIG. 12, the storage devices NVMe can form two RAID groups RAID1, RAID2. Storage devices of each RAID group can issue and receive a global garbage collection message. After the global garbage collection is performed, a RAID may be rebuilt.

The host system of the present disclosure may be a structure used together with a hard disk drive (HDD).

Figure 13:
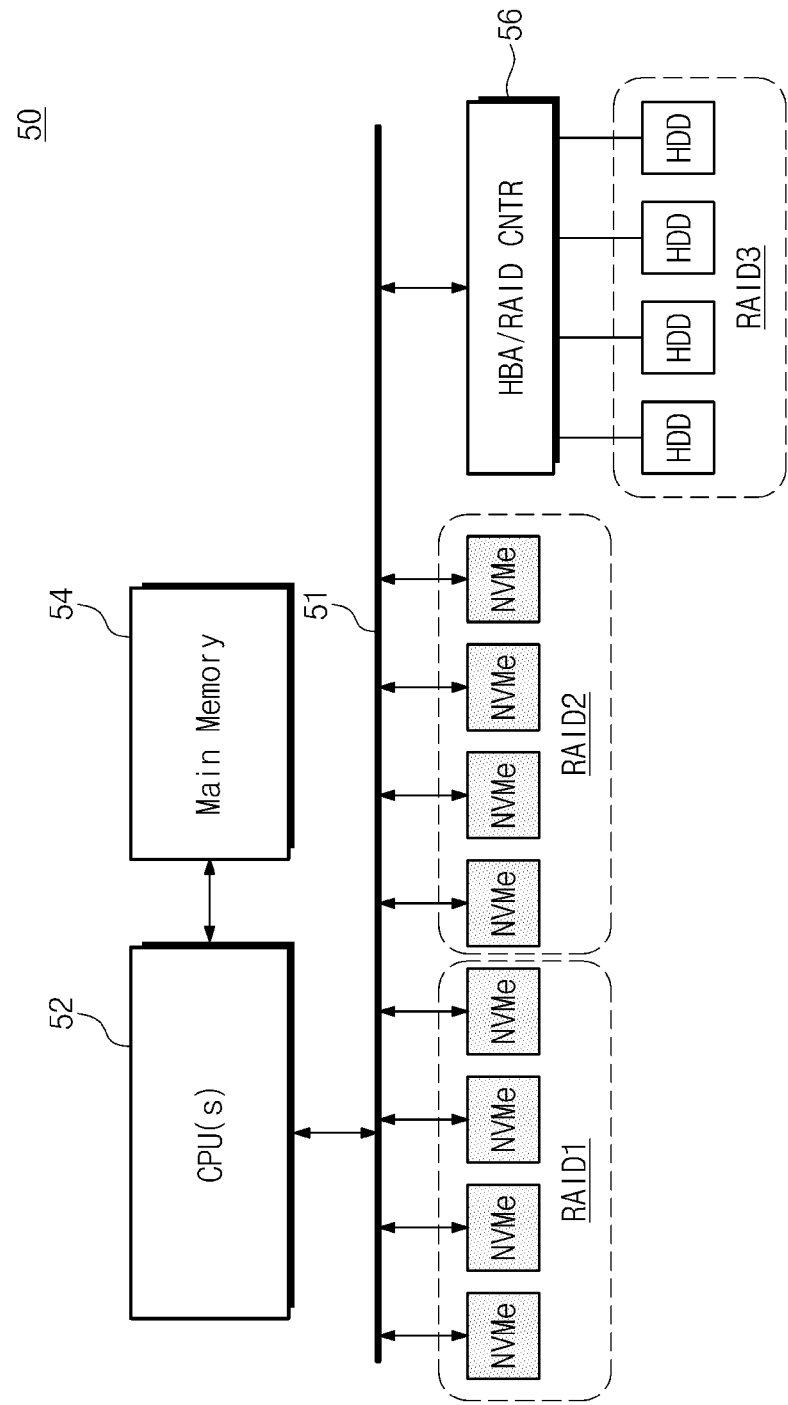
FIG. 13 is a drawing illustrating a host system according to an exemplary embodiment of the inventive concepts of the present disclosure.

FIG. 13 is a drawing illustrating a host system according to an exemplary embodiment of the inventive concepts of the present disclosure. Referring to FIG. 13, a host system 50 may include a host having at least one central processing unit 52 and a main memory 54, RAIDs (RAID1, RAID2) having a plurality of storage devices NVMe, a storage controller 56, and a RAID3 having a plurality of hard disks HDDs connected to the storage controller 56. Each of the storage devices NVMe constituting the RAID1 and the RAID2 may be configured to issue and receive a multicast garbage collection command using a point-to-point interface.

The inventive concepts of the present disclosure can embody a consistent low latency environment by completely removing a performance drop period by a garbage collection in a server environment.

The inventive concepts of the present disclosure can autonomously perform a global garbage collection without cooperation of a company using an SSD by performing the global garbage collection using only SSD internal resources.

The inventive concepts of the present disclosure can strengthen self-management performance in a server environment by establishing a network environment between SSDs included in the same RAID group using only SSD internal resources.

In FIGS. 1 through 13, a global garbage collection with respect to a storage device supporting a multicast operation was described. However, the present disclosure is not limited thereto. In the present disclosure, any one storage device in a write group can receive a global garbage collection message from other storage devices and transfer the message to the remaining storage devices.

Figure 14:
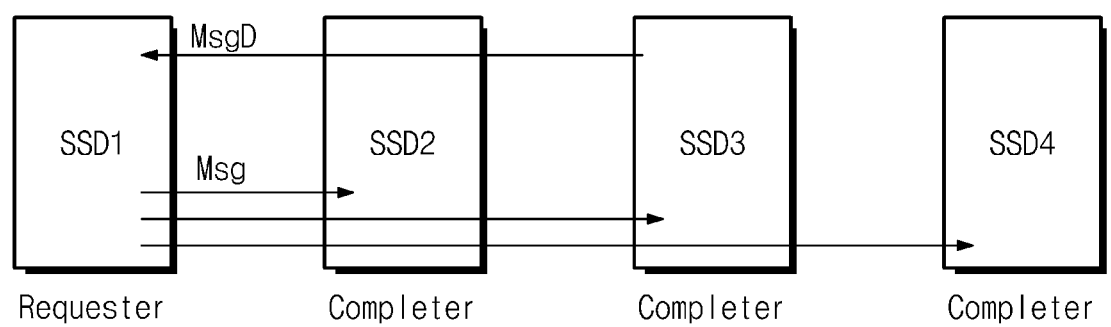
FIG. 14 is a drawing illustrating a global garbage collection method according to an exemplary embodiment of the inventive concepts of the present disclosure.

FIG. 14 is a drawing illustrating a global garbage collection method according to an exemplary embodiment of the inventive concepts of the present disclosure. Referring to FIG. 14, a first storage device SSD1 may receive a global garbage message GC_MSG from a third storage device SSD3 and may transfer the received global garbage message GC_MSG to second, third and fourth storage devices SSD2, SSD3, SSD4. The second, third and fourth storage devices SSD2, SSD3, SSD4 may start a garbage collection in response to the received global garbage message GC_MSG.

The memory system or the storage device according to an exemplary embodiment of the inventive concepts of the present disclosure can be mounted using various types of packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

A storage device in accordance with an exemplary embodiment of the inventive concepts of the present disclosure and a data storage system having the storage device can effectively manage data and obtain the optimum performance by performing a global garbage collection using a multicast operation.

The foregoing is illustrative of the inventive concepts of the present disclosure and is not to be construed as limiting thereof. Although a few embodiments of the inventive concepts of the present disclosure have been described, those skilled in the art will readily appreciate that many modifications are possible in the embodiments without materially departing from the novel teachings and advantages of the inventive concepts of the present disclosure. Accordingly, all such modifications are intended to be included within the scope of the inventive concepts of the present disclosure as defined in the claims. The inventive concepts of the present disclosure is defined by the following claims, with equivalents of the claims to be included therein

What is claimed is:

1. A garbage collection method of a data storage system having a plurality of storage devices, the method comprising:
   determining whether a garbage collection is needed in a first storage device among the plurality of storage devices;
   transferring one or more multicast garbage collection commands from the first storage device to at least one other storage device in a write group through a multicast operation; and
   performing the garbage collection in the first storage device,
   wherein each of the one or more multicast garbage collection commands comprises garbarge collection time information for performing the garbarge collection, and
   wherein each of the one or more multicast garbage commands is a packet comprising a header and a payload, the header comprising an identification number with respect to the write group, the payload comprising the garbage collection time information.

2. The garbage collection method of claim 1, wherein the determining whether the garbage collection is needed comprises determining whether the number of free blocks is less than a predetermined value.

3. The garbage collection method of claim 1, wherein the transferring the one or more multicast garbage collection commands from the first storage device to the at least one other storage device further comprises:
   transferring the one or more multicast garbage collection commands to a virtual channel; and
   transferring the one or more multicast garbage collection commands from the virtual channel to at least one downstream port corresponding to the write group based upon a multicast lookup table, the at least one downstream port being connected to the at least one other storage device.

4. The garbage collection method of claim 3, wherein the transferring the one or more multicast garbage collection commands from the first storage device to the at least one other storage device further comprises:
   copying the one or more multicast garbage collection commands; and
   transferring the copied one or more multicast garbage collection commands to the at least one downstream port.

5. The garbage collection method of claim 1, wherein the garbage collection time information is determined by the number of memory blocks relevant to the garbage collection.

6. The garbage collection method of claim 1, wherein each of the one or more multicast garbage collection commands comprises time information of starting the garbage collection.

7. The garbage collection method of claim 1, further comprising receiving the one or more multicast garbage collection commands by the at least one other storage device.

8. The garbage collection method of claim 7, further comprising determining whether the one or more multicast garbage collection commands received by the at least one other storage device include two or more multicast garbage collection commands.

9. The garbage collection method of claim 7, further comprising performing the garbage collection with respect to the at least one other storage device.

10. A data storage system comprising:
a plurality of storage devices includes a first storage device and at least one other storage device; and
processor configured to perform garbage collection in the plurality of storage devices,
wherein the first storage device comprises:
- a first garbage collection management unit configured to determine whether the garbage collection is needed in the first storage device;
- a first storage interface configured to transfer one or more multicast garbage collection commands from the first storage device to the at least one other storage device in a write group through a multicast operation, wherein the at least one other storage device comprises a second garbage collection management unit and a second storage interface configured to receive the one or more multicast garbage collection commands from the first storage device, and wherein the second garbage collection management unit is configured to determine whether the one or more multicast garbage collection commands received by the at least one other storage device includes two or more multicast garbage collection commands, and determines a priority of the one or more multicast garbage collection commands if the one or more multicast garbage collection commands received by the at least one other storage device includes the two or more multicast garbage collection commands.

11. The data storage system of claim 10, wherein the second garbage collection management unit determines the priority depending on garbage collection time information included in each of the one or more multicast garbage collection commands.

12. A storage device comprising:
a plurality of nonvolatile memory devices; and
a memory controller configured to issue a first multicast garbage collection command when a garbage collection is needed, the memory controller being configured either to transfer the first multicast garbage collection command to other storage devices in a write group through a multicast operation or to receive a second multicast garbage collection command from at least one of the other storage devices through the multicast operation, and the memory controller being configured to perform the garbage collection in response to the first multicast garbage collection command or the second multicast garbage collection command,
wherein the memory controller comprises a garbage management unit configured in a firmware form, the memory controller being configured to issue the first multicast garbage collection command or to perform the garbage collection in response to the first and second multicast garbage collection commands.

13. The storage device of claim 12, wherein the garbage collection management unit determines a priority using garbage collection time information included in the first multicast garbage collection command and/or the second multicast garbage collection command.

14. The storage device of claim 12, further comprising a storage interface configured to input and output each of the first and second multicast garbage collection commands to an external device.

15. The storage device of claim 14, wherein the storage interface is a peripheral component interconnect express (PCIe) interface.

16. The storage device of claim 12, wherein each of the plurality of nonvolatile memory devices is a V-NAND flash memory device, and
the storage device is a solid state drive (SSD).

* * * * *